United States Statutory Invention Registration [19]

[11] Reg. Number: H997

Bronson

[43] Published: Nov. 5, 1991

[54] VIDEO DISPLAY ENHANCEMENT

[76] Inventor: Barry S. Bronson, 13750 Via Alto Ct., Saratoga, Calif. 94070

[21] Appl. No.: 499,103

[22] Filed: Mar. 26, 1990

[51] Int. Cl.[5] ..... G06F 15/62

[52] U.S. Cl. ..... 364/521; 340/747; 340/750; 382/47; 382/56

[58] Field of Search ..... 364/521, 518; 340/747, 340/750; 382/47, 56

[56] References Cited

U.S. PATENT DOCUMENTS

| | | | |
|---|---|---|---|
| 4,790,028 | 12/1988 | Ramage | 382/47 |
| 4,862,389 | 8/1989 | Takagi | 364/521 |
| 4,888,643 | 12/1989 | Kusakabe | 358/183 |
| 4,890,257 | 12/1989 | Anthias et al. | 364/900 |
| 4,891,770 | 1/1990 | Hollett | 364/521 |
| 4,893,258 | 1/1990 | Sakuragi | 364/521 |

*Primary Examiner*—Bernarr E. Gregory

[57] ABSTRACT

A method for enhancing video displays in which a selected target area is enlarged to fill an exploded view area while display information between the target and maximum affected areas is compressed and displayed within a continuity zone surrounding the exploded view area.

1 Claim, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

10

VIDEO DISPLAY ENHANCEMENT

BACKGROUND OF THE INVENTION

1. Field of the Invention

This invention relates to video display techniques, and in particular to techniques for enhancing video displays associated with computers, especially microcomputers. The present invention specifically relates to video display enhancement techniques used in conjunction with computer driven graphical displays, such as those used with CAD or computer aided drafting software.

2. Description of the Prior Art

The conventional prior art approach to techniques for graphical video display enhancement is a technique called windowing in which the display, under operator and/or computer control, is overlaid by another display. Windowing may be used in a manner in which the overlaying display covers all, or only a portion, of the original display. The overlaying display may be a display of different or even the same information as the original display. The overlaying display may be at the same or a different magnitude or scale as the original display.

These conventional techniques may be used in a manner in which a portion of the original display may be overlaid by an enlarged replica of a smaller portion of that display in order to present to the operator a zoomed or magnified view of a portion of interest within the original display while continuing to display that portion of the original display in the background for reference (to the extent that such original display is not concealed by the overlaying display).

Such conventional video graphics enhancement techniques are typically cumbersome and therefore often under utilized. Such techniques also suffer from a severe disadvantage which further restricts their use. This disadvantage is that these techniques result in discontinuous displays, that is, interconnections between the normal or unenlarged display area and the zoomed or enlarged display area are concealed at least in part by the zoomed display.

The discontinuity of such conventional graphics enhancement display techniques is particularly disadvantageous in CAD or other graphics environments where the interconnection information may be vital to the operator.

SUMMARY OF THE INVENTION

The preceding and other shortcomings of the prior art are addressed and overcome by the present invention that provides a method of enhancing a video display by selecting a target area within a first display to be enhanced, selecting a maximum area, surrounding the target area, to be affected within the first display, selecting an exploded view area, within the maximum affected area and including the target area, and creating a second display in which the target area is enlarged to fill the exploded view area and the display between the target and maximum areas is compressed to fit in a continuity zone between the exploded and maximum areas.

These and other features and advantages of this invention will become further apparent from the detailed description that follows which is accompanied by a set of drawing figures. In the figures and description, numerals indicate the various features of the invention, like numerals referring to like features throughout both the drawings and the description.

DETAILED DESCRIPTION OF THE PREFERRED EMBODIMENT(S)

Figure 1:
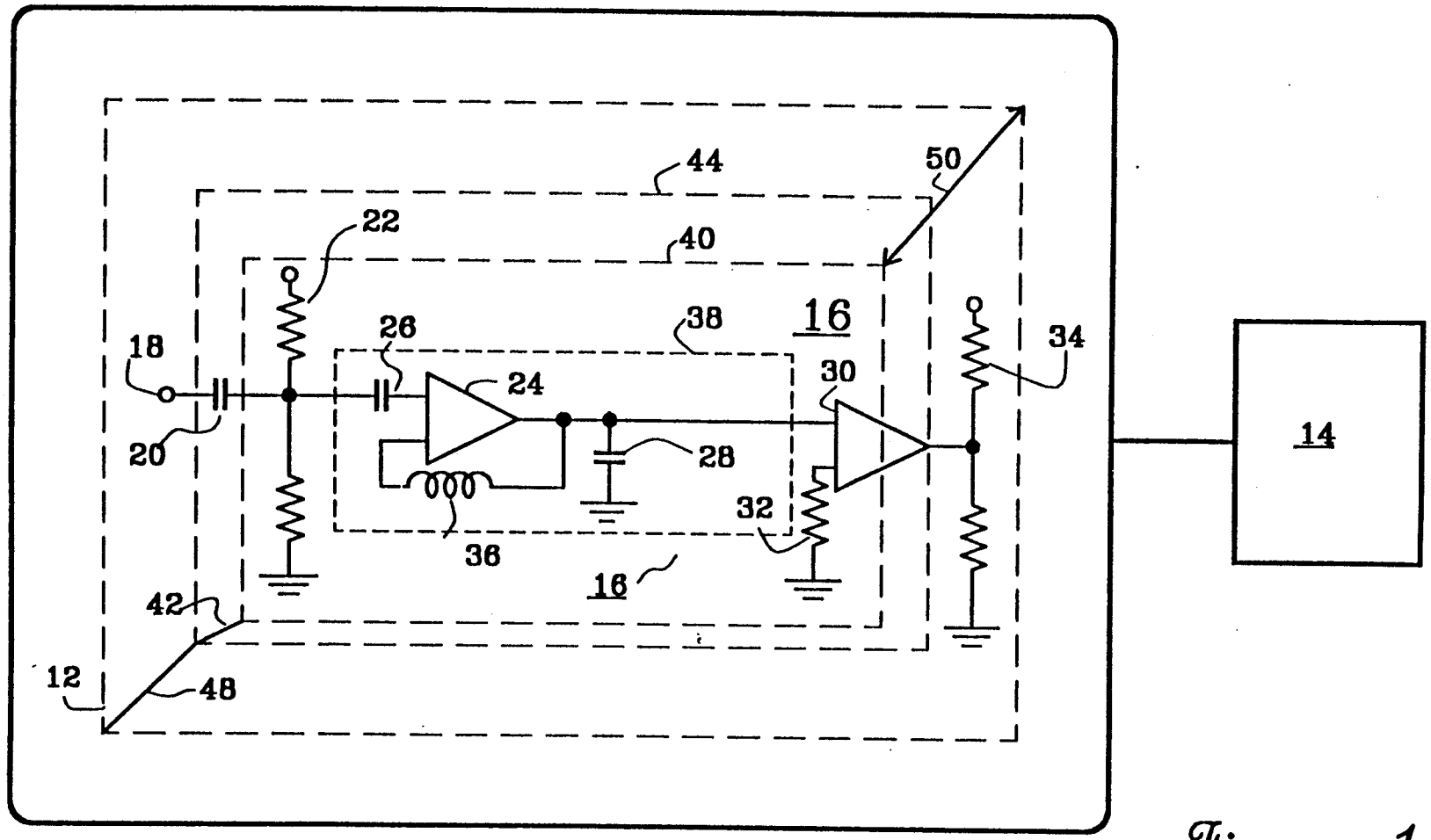
FIG. 1 is an illustration of the areas affected in a normal computer video display by the enhancement techniques of the present invention.

FIG. 1 is an illustration of the various display areas affected in display area 12 of video display 10 by the video enhancement techniques of the present invention. Video display 10 is connected to a conventional video display driver, such as computer 14 which is programmed to control video display 10 as well as perform other functions.

Display area 12 represents the maximum video display area available for display to the operator. For the purposes of this discussion, it is assumed that video display 10 is operating in a graphical display mode to present a graphical display to the operator such as an electronic schematic, shown in FIG. 1 as circuit 16. Circuit 16 forms no part of the present invention but rather will be described in detail in order to better explain and demonstrate the display enhancement techniques of the present invention.

Circuit 16 includes input 18 connected through capacitor 20 to resistor divider 22 and then to op amp 24 through capacitor 26. The output of op amp 24 is connected through component 36 to one of its inputs and to filter capacitor 28 as well as one input of op amp 30, the other input of which is grounded through resistor 32. The output of op amp 30 is connected to voltage divider 34.

It is assumed for the purpose of this discussion that circuit 16 is being displayed upon display area 12 by computer 14 during the operation of a software program, such as a schematic capture or other CAD program not forming any part of this invention.

In addition to the components described above, circuit 16 includes additional component 36 connected between the output and one input of op amp 24. In order to view additional component 36 more clearly, the operator could zoom in by means of the software operating computer 14 to enlarge target area 38, which includes additional component 36, so that target area 38 fills display area 12.

In some circumstances, this would be unsatisfactory because the operator may need some of the information which would no longer be displayed if target area 38 were expanded to fill display area 12. In the particular example used in FIG. 1, the interconnections between op amp 24 via capacitor 26 would no longer be displayed. That is, the operator would no longer be able to see divider 22, circuit 16 nor input 18. The difficulty with this conventional approach becomes worse as the complexity of the displayed graphical data is increased.

With some conventional software, it is possible to view target area 38 in an enlarged view by overlaying this enlarged view over some portion of the remaining original display. This technique does not necessarily require the use of the entire available area of display area 12. Therefore some of the graphical information not within the enlarged view of target area 38 would potentially remain available to the operator.

Some of course would still be lost, that is, no longer on current display. This data would be retrievable in response to operator interaction, but would be lost in the sense that it would not be concurrently available to the operator on the display. The relationship between the enlarged view of the graphical information within target area 38 and any original information remaining on display within display area 12 will be difficult or impossible to discern without operator intervention to change the display.

In accordance with the present invention, the operator is provided with a technique for obtaining an enlarged view of target area 38 while retaining, concurrently on the same display, residual information from the original display as well as substantial interconnection or relational information between the information within target area 38 and the graphical information of the original display.

In particular, the present invention provides the operator with access to an enlarged view of target area 38 which covers a portion of display area 12 larger than the original size of target area 38. The operator has concurrent access on the same display to a residual and unaltered portion of the original display as well as to a continuity zone display between these other displays which conveniently displays the graphical information previously between these displays in a distorted, but complete and convenient, altered display format.

In the example shown in FIG. 1, target area 38 would be enlarged to fill the area identified in dotted line as exploded view 40. In addition to using the display area covered by exploded view 40, the present invention utilizes continuity zone 42 surrounding exploded view 40 and extending to the larger display area shown in FIG. 1 as fisheye display zone 44.

The term "fisheye" is used herein to indicate that the general appearance of the enlarged view according to the present invention is reminiscent of the view through a so-called fisheye camera lens. The relationship between the distorted and undistorted displays is not, however, necessarily the same as would occur through the use of an optical fisheye lens system.

Figure 2:
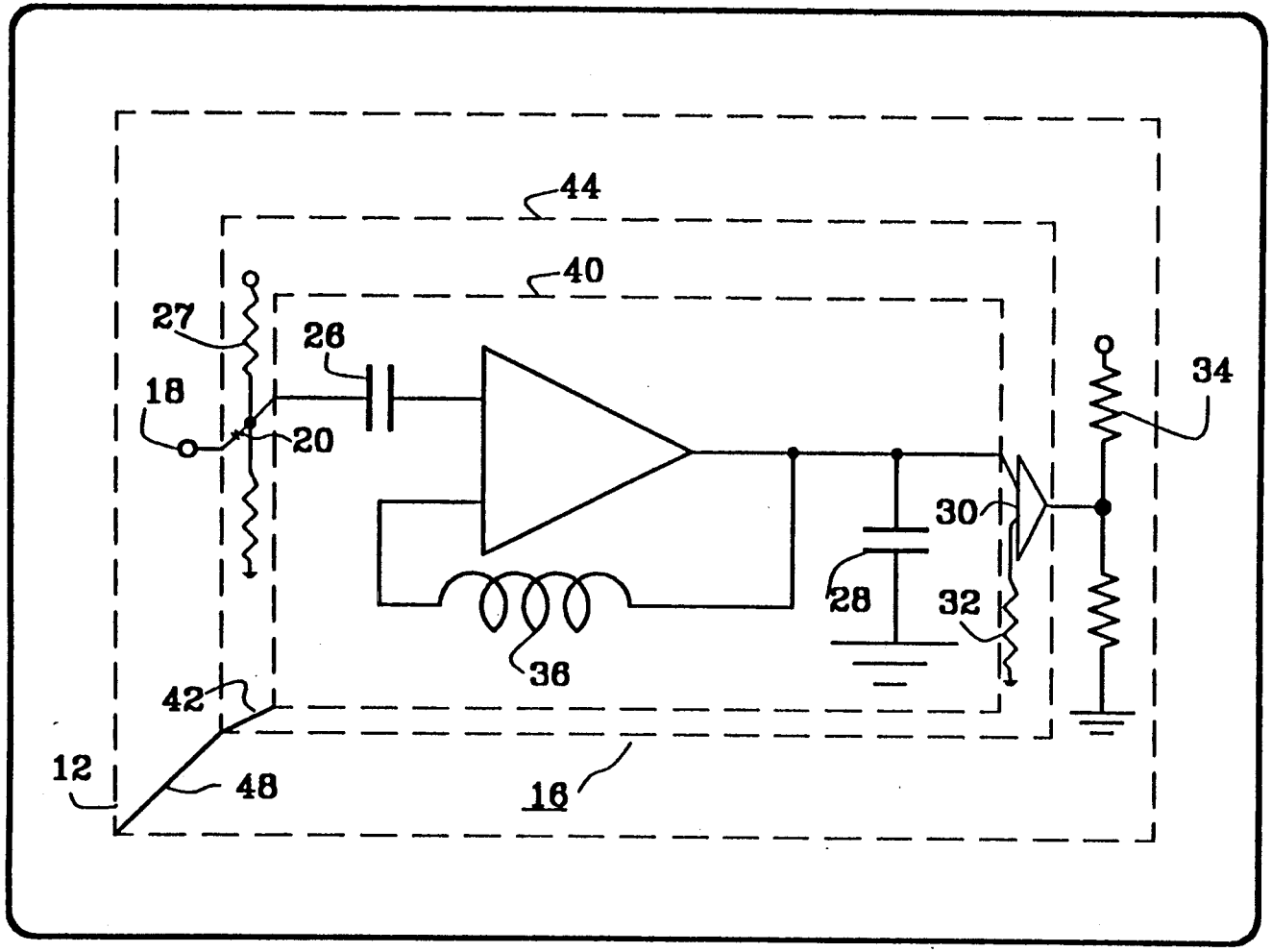
FIG. 2 is an illustration of the display area depicted in FIG. 1 after enhancement in accordance with the present invention.

In accordance with the present invention, as shown more clearly with reference to FIG. 2, exploded view 40 is an undistorted, enlarged or exploded view of target area 38. In this figure, target area 38 is shown centered in the display, but may in practice be located elsewhere on the display. Residual display zone 48 is the display area outside of fisheye display zone 44 and it is displayed as it was originally, that is, it is an unchanged and therefore undistorted display of the portion of circuit 16 beyond the boundaries of fisheye display zone 44. Interconnection zone 50 shown in FIG. 1 is the portion of the original display not included within either target area 38 or residual display zone 48.

The graphical information within interconnection zone 50, especially the information concerning the relationship between elements displayed within undistorted displays in target area 38 and residual display zone 48 would be lost in conventional techniques for enlarging target area 38.

In accordance with the current invention, however, all or at least a substantial portion of the graphical information within interconnection zone 50 shown in FIG. 1 is retained for use by the operator by compressing the original information within interconnection zone 50 to fit within continuity zone 42 as shown in FIG. 2.

This compression may, depending on the relationship between the sizes of the various zones, result in substantial graphical distortion of the information. However, as may be seen in FIGS. 2 and 3, the interconnection information is preserved in a useful and convenient form. This is particularly important in certain types of graphical displays, such as the schematic information shown in FIG. 2.

In particular, with regard to circuit 16, undistorted graphical information is displayed in an enlarged view for capacitor 26, op amp 24, filter capacitor 28 and additional component 36, all within target area 38, now enlarged to fill exploded view 40. An undistorted, but not enlarged, view of input 18 and voltage divider 34 all within residual display zone 48 is also displayed.

However, as shown in FIG. 2, capacitor 20 and divider 22 are within interconnection zone 50 and are therefore displayed within continuity zone 42 in a compressed form. Although distorted, the graphical information within continuity zone 42 permits the operator to see that input 18 is connected to capacitor 26 through capacitor 20 and divider 22 while the operator is viewing target area 38 enlarged to fill the larger display area of exploded view 40.

Similarly op amp 30 and resistor 32 are also within interconnection zone 50 of FIG. 1 and would in a conventional display enhancement approach be overlaid and therefore hidden by exploded view 40 and or continuity zone 42. However, as shown in FIG. 2, in accordance with the present invention, op amp 30 and resistor 32 are displayed within continuity zone 42 while retaining the same interconnection information they displayed before enhancement of target area 38 as may be seen clearly be comparing FIG. 2 with FIG. 1.

The specific type of compression used to compress the data within interconnection Zone 50 to fit Within continuity zone 42 may conveniently be selected in accordance with the particular application of the software being used. In general, a simple linear compression, such as that shown in continuity zone 42 in FIG. 2 may be satisfactory.

Figure 3:
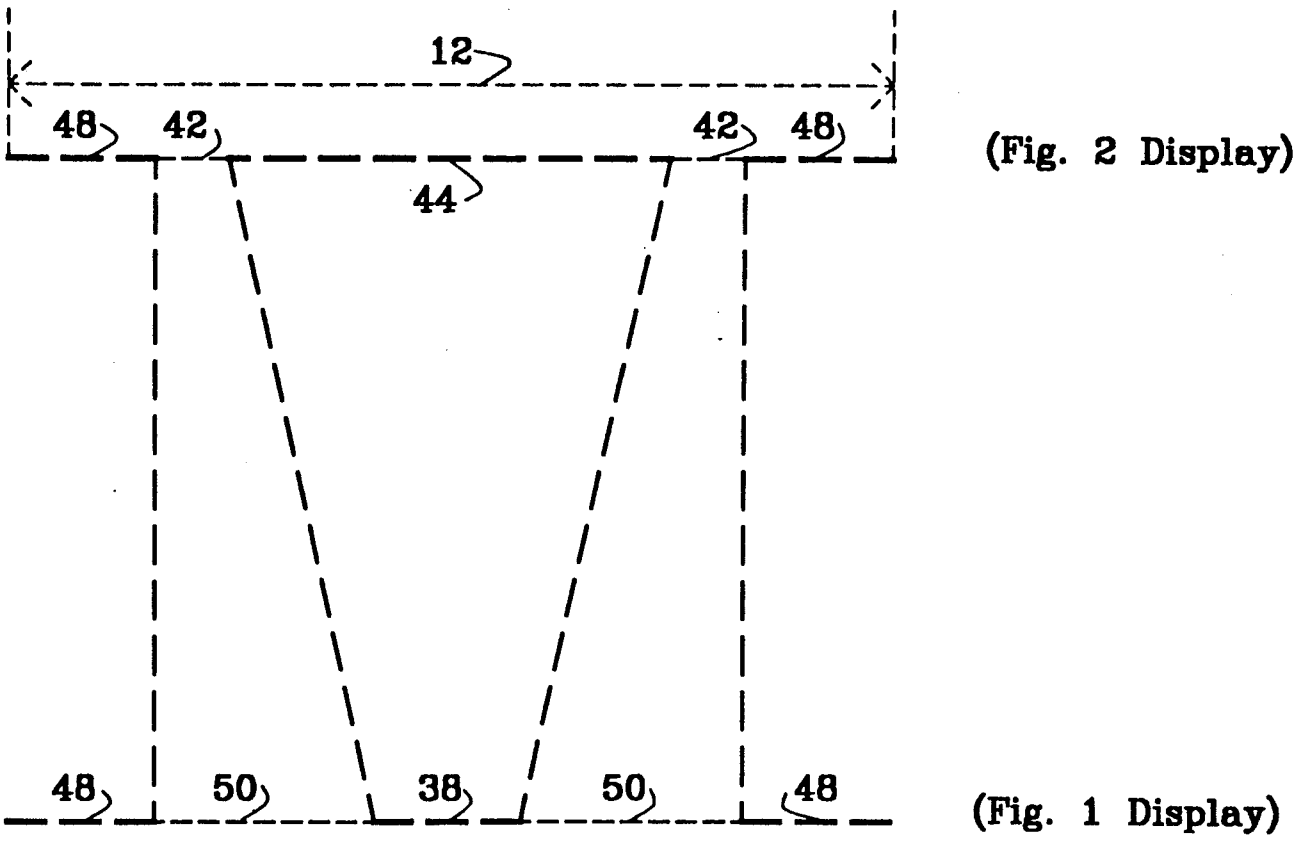
FIG. 3 is a cross section view of the relationship between the displays shown in FIGS. 1 and 2.

The compression may be easily described with reference to the illustration in FIG. 3, in which a cross section of the un-enhanced display area 12 originally depicted in FIG. 1, is shown below a cross section of an enhanced display area 12, originally shown in FIG. 2.

Residual display zone 48 is projected from FIG. 1 display to FIG. 2 display without change or modification. Residual display zone 48 may be reduced in size, or eliminated entirely, in order to maximize the display of other zones, such as continuity zone 42. Target area 38 is of course enlarged to fill fisheye display zone 44 when it is projected from FIG. 1 display to FIG. 2 display. This projection has been shown herein as a linear projection although non-linear projection may be used within the scope of this invention if appropriate for the application.

Interconnection zone 50 is projected from FIG. 1 display and compressed to fit within continuity zone 42 in FIG. 2 display in accordance with a preselected set of compression rules which may be linear or not, again according to the requirements of the particular application.

In fact, in certain applications it may be convenient to intentionally add distortion, particularly in the form of non-linearity, to the display within exploded view 40 to improve operator display interpretation. For example, the non-linearities could increase in accordance with the distance from the center, or a central zone, of target area 38. This could be used to make the display more like the optical display that would result from a fisheye lens.

In some applications this may prove useful so that the display in the center of exploded view 40 was substantially linear but the transition to the substantial non-linearly within continuity zone 42 would be less noticeable or less distracting to the operator.

In a similar manner, a second continuity zone, not shown, could be added with a distortion less than the outer continuity zone so that the operator distraction could be further reduced.

A substantial enhancement of the present invention is achievable by providing the operator with control of the position of the enlarged or exploded view. That is, with regard to FIG. 2 as an example, the operator may be provided with a mechanism for moving target area 38. This may be accomplished with conventional software and pointing devices, such as a mouse, which would permit the operator to move or resize the target area for the operator's convenience during use of the system.

Target area 38 could be shrunk to exclude filter capacitor 28 so that additional component 36 could be enlarged more or so that the distortion required in continuity zone 42 could be reduced for operator convenience.

A further enhancement would be the use of an additional operator interface such as a light pen, not shown, that would permit the operator to interact with the display directly to more conveniently move target area 38 and therefore resultant exploded view 40 by interaction with the screen.

An embodiment of the present invention has been described above with regard to graphical displays. It is, of course suitable for use with textual displays, desk top publishing, page composition and multi-media applications. With textual video displays, continuity zone 42 might remain in a zone surrounding exploded view 40 or, if appropriate for the application, might only be used at the sides of the target area permitting some of the display, such as other lines above and below the target, to be hidden by exploded view 40.

While this invention has been described with reference to its presently preferred embodiment(s), its scope is not limited thereto. Rather, such scope is only limited insofar as defined by the following set of claims and all equivalents thereof.

What is claimed is:

1. A method of enhancing a video display comprising the steps of:

selecting a target area to be enhanced within the video display;

selecting a maximum area, surrounding the target area, within the video display;

selecting an exploded view area, within the maximum area and including the target area; and creating a second display in which the target area is enlarged to fill the exploded view area, the display between the target and maximum areas is compressed to fit between the exploded and maximum areas, and the area within the video display outside the maximum area is displayed without change.

* * * * *